US009806509B1

(12) United States Patent
Heinis et al.

(10) Patent No.: US 9,806,509 B1
(45) Date of Patent: Oct. 31, 2017

(54) FIRE-RESISTANT ELECTRICAL BOX

(71) Applicant: FSR Inc., Woodland Park, NJ (US)

(72) Inventors: Kenneth A. Heinis, Little Falls, NJ (US); Richard B. Wilson, Highland Lakes, NJ (US); John Macaluso, Clifton, NJ (US)

(73) Assignee: FSR, Inc., West Paterson, NJ (US)

( * ) Notice: Subject to any disclaimer, the term of this patent is extended or adjusted under 35 U.S.C. 154(b) by 0 days.

(21) Appl. No.: 15/177,835

(22) Filed: Jun. 9, 2016

(51) Int. Cl.
| | |
|---|---|
| *H02G 3/14* | (2006.01) |
| *H02G 3/12* | (2006.01) |
| *H05K 5/04* | (2006.01) |
| *H05K 5/02* | (2006.01) |
| *H05K 5/03* | (2006.01) |
| *H02G 3/04* | (2006.01) |

(52) U.S. Cl.
CPC ............. *H02G 3/12* (2013.01); *H02G 3/0412* (2013.01); *H02G 3/14* (2013.01); *H05K 5/0204* (2013.01); *H05K 5/0247* (2013.01); *H05K 5/03* (2013.01); *H05K 5/04* (2013.01)

(58) Field of Classification Search
CPC combination set(s) only.
See application file for complete search history.

(56) References Cited

U.S. PATENT DOCUMENTS

| | | | |
|---|---|---|---|
| 6,353,180 B1 * | 3/2002 | DeBartolo, Jr. ..... | H02G 3/0493 174/483 |
| 7,348,484 B1 * | 3/2008 | Ackerman .......... | H02G 3/0412 174/50 |
| 8,629,348 B2 * | 1/2014 | Moselle ................. | E04B 9/001 174/50 |

* cited by examiner

*Primary Examiner* — Dhirubhai R Patel
(74) *Attorney, Agent, or Firm* — Florek & Endres PLLC

(57) ABSTRACT

A fire-resistant electrical box assembly includes an outer box assembly having an outer top panel, an outer bottom panel, an outer first side panel, an outer second side panel, an outer back panel, an inner back panel, and a front panel forming an opening substantially covered by a front cover, an inner box assembly having one or more of an inner top panel, an inner bottom panel, an inner first side panel, and an inner second side panel, and an intumescent material between at least a portion of the outer back panel and the inner back panel.

20 Claims, 5 Drawing Sheets

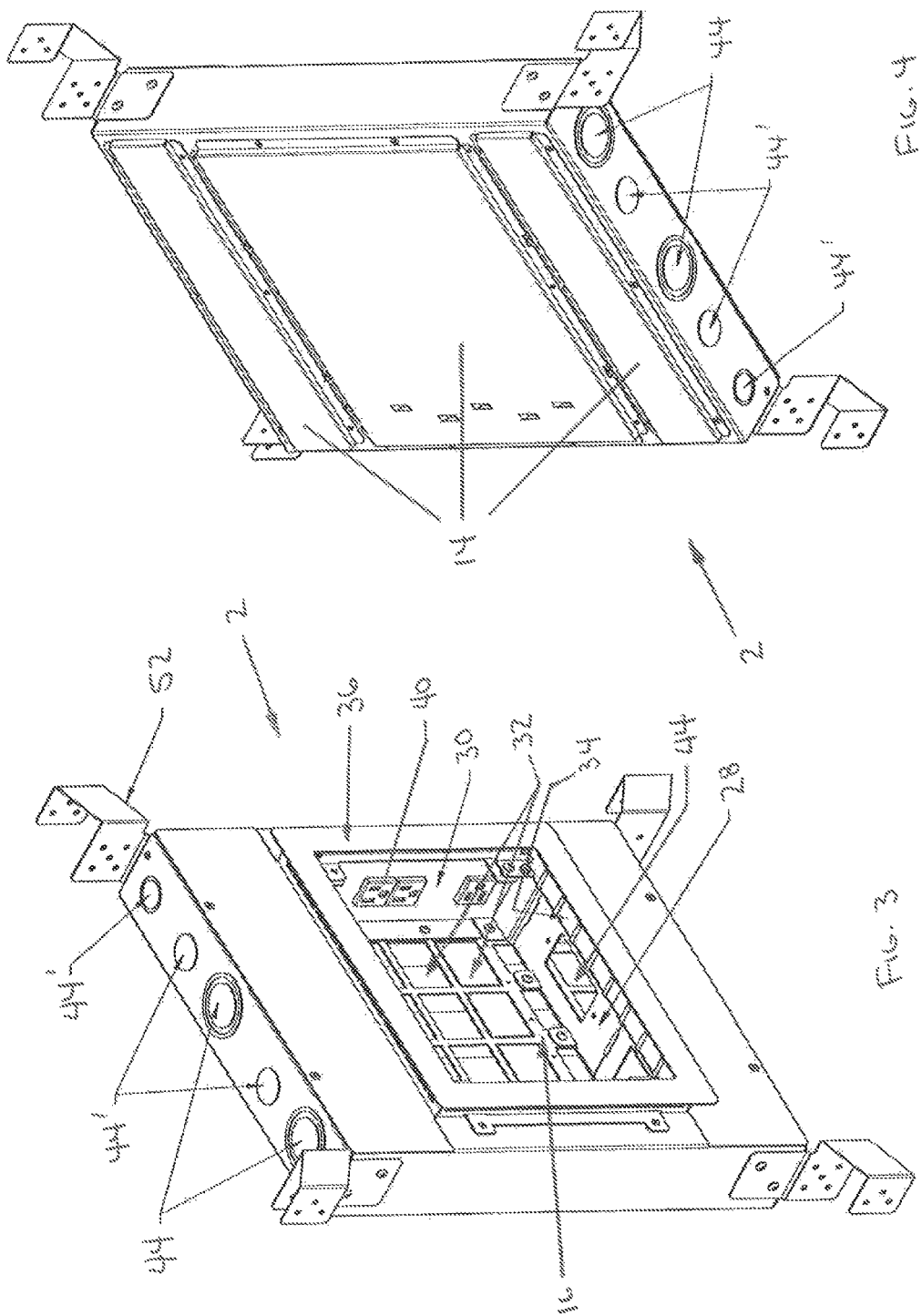

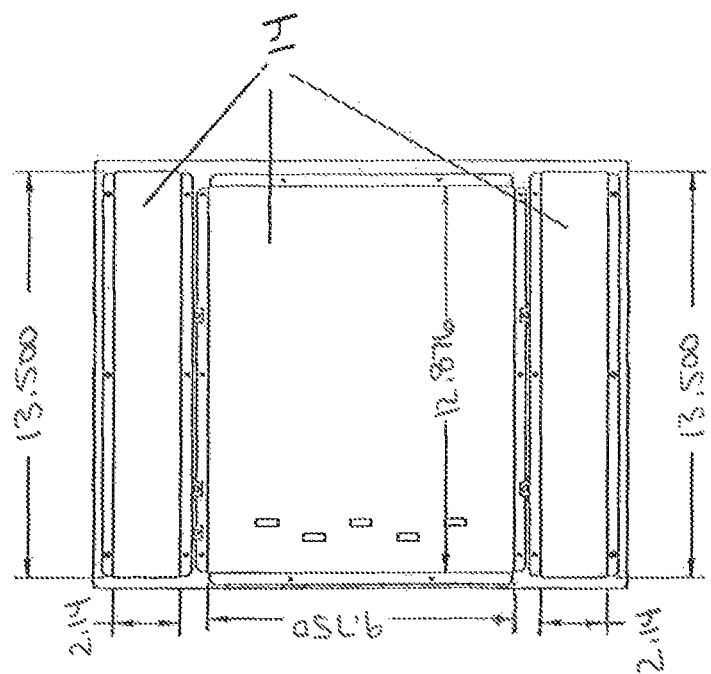
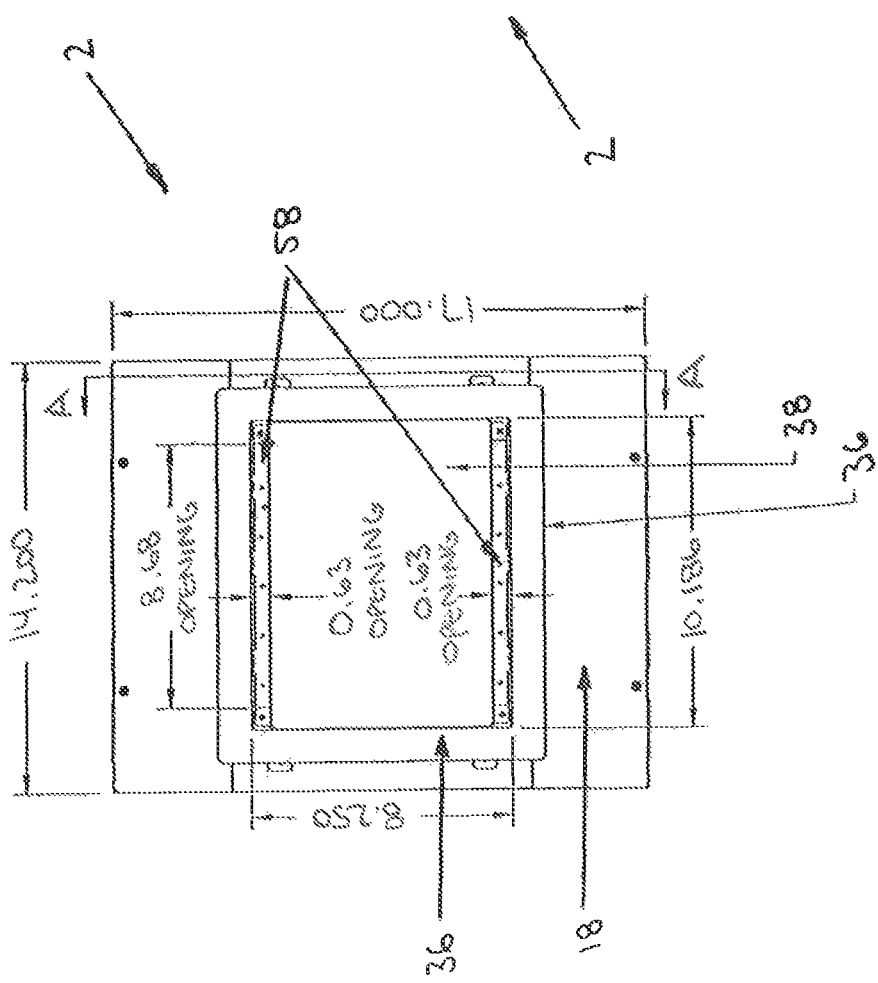

FIRE-RESISTANT ELECTRICAL BOX

FIELD OF THE INVENTION

The present invention relates to the field of fire-resistant electrical boxes, and more specifically to a fire-resistant electrical box for maintaining one-hour fire-resistance integrity, including means to install electrical, audio-visual equipment or other digital media connections.

BACKGROUND OF THE INVENTION

A critical issue in the design and construction of buildings is the consideration of fire-safety. For instance, UL, ASTM and building codes have long used fire-resistance ratings to measure the performance of various construction materials for fire containment purposes. Fire-resistance ratings classify the ability of a material or device to confine or isolate fire within walls, ceilings and floor assemblies.

Today, any hole cut into a fire-resistant wall will compromise the fire rating. Therefore, mounting electrical boxes on or in a fire wall have created issues in maintaining the fire rating of fire-resistant walls. In an effort to avoid compromising the fire-resistance rating of walls, contractors generally defaulted to moving electrical boxes from fire-resistant walls to non-fire-resistant walls.

It is therefore an object of the present invention to provide a recessed fire-resistant electrical box for mounting electrical, audio-visual or other digital media devices within a fire-resistant wall while maintaining the one-hour fire rating of the wall.

A further object of the present invention is to position intumescent material in the recessed fire-resistant electric box such that it provides even distribution of the intumesced materials in a specific direction to close any openings and maintain the one-hour fire rating of a fire-resistant wall.

It is also an object of the present invention to provide venting and cable exits that permit access to the electrical box absent conditions that cause the intumescent material to expand.

SUMMARY OF THE INVENTION

These and other objects are achieved by the present invention, which is directed to an easily installed, recessed, wall-mounted fire-resistant electrical box constructed with a heat activated intumescent fire-resistant material, which maintains the one-hour fire rating of the wall. The fire-resistant electrical box of the invention is designed to fit within a wall, between and mounted to one or more wall studs.

The fire-resistant electrical box assembly comprises an outer box assembly having an outer top panel, an outer bottom panel, an outer first side panel, an outer second side panel, an outer back panel, an inner back panel, and a front panel forming an opening substantially covered by a front cover, as well as an inner box assembly having one or more of an inner top panel, an inner bottom panel, an inner first side panel, and an inner second side panel, and an intumescent material between at least a portion of the outer back panel and the inner back panel.

The electrical box preferably further comprises an intumescent material associated with the front cover, preferably on the interior of the front cover itself, i.e., on a front cover frame, on the front panel, or the like. Additional intumescent material may be associated with the outer or inner top, bottom and/or side panels of the outer and/or inner box assemblies as well, and installation of the electrical box assembly in a wall may further include the use of an intumescent caulk material about the drywall material.

In keeping, the present invention provides that the intumescent material is directed to the back and, optionally, the front and/or sides of the electrical box assembly. Additionally, the electrical box assembly provides that wiring to outlets, jacks and the like accessible on the inside of the inner box assembly can be contained in one or more areas between the outer box assembly and the inner box assembly. For example, AC outlets can be mounted on one or more of the top, bottom or side panels of the inner box assembly, with the AC wiring to the outlet contained in the area between the inner box assembly and the outer box assembly, and covered by the front panel.

To assist in the connection of wiring to the electrical box assembly, the panels of the outer box assembly and/or inner box assembly may include knock outs which can be removed for the passage of wiring into the electrical box assembly. For example, concentric knockouts can be placed on the top and/or bottom panels of the outer box assembly, allowing for the passage of AC wires into the area between the inner and outer box assemblies where it can be connected to an AC outlet accessed on the interior of the inner box assembly. The AC outlets can then be used to power audio-visual equipment and/or other devices requiring AC power. Similarly, the inner box panels may have knock outs adapted to receive other cables, wires and the like for supplying other outlets, jacks, connectors or the like that are accessible from the interior of the inner box assembly.

The various components of the outer box assembly and the inner box assembly, as well as the front panel, can be integrally formed or formed of component members that are then fashioned together, by any known connection or attachment means, to form the components of the electrical box assembly.

The panels of both the outer box assembly and the inner box assembly, as well as the back panels and front panel, are preferably made of a metal material or similar material that provides protection to the contents of the electrical box assembly and structural integrity during high heat conditions. Notwithstanding, the cover can be made of any suitable material for closing the opening in the front frame panel.

In the preferred embodiment, the intumescent material is located on the interior of the outer back panel or the exterior of the inner back panel, so that it intumesces to close any openings to the interior of the inner box assembly. In one embodiment, the outer back panel is at least partially formed to include intumescent holders at one or more of the outer edges, to seal the area between the outer back panel and the back of the inner box assembly. In the preferred embodiment, the intumescent material used in the electrical box assembly of the present invention provides a one-hour fire-resistant rating.

The front cover is preferably adapted to cover virtually all of the opening on the front panel, generally corresponding to the size of the inner box assembly, most preferably leaving one or more apertures to permit cable passage from the interior to the exterior and to vent the interior of the electrical box assembly. In a preferred embodiment, the cover includes a cover frame that affixes to the front panel about the opening in the front panel, having a lip that extends beyond the inner top, bottom and side panels to provide a finished frame about the inner box assembly, and includes means for receiving or mounting a cover panel. The cover panel can be fixed to the cover frame by any known means, including snap in, hinged and fastener connections, such as screws that hold the cover panel to the cover frame, which is most preferred.

In a preferred embodiment, the aperture associated with the front cover is provided by making the cover panel slightly smaller than the opening in the cover frame, leaving a gap between the cover panel and the cover frame. In a most preferred embodiment, a gap between the cover panel and the cover frame is formed at each of the top and bottom edges of the cover panel. Such an embodiment is particularly well suited for use of an intumescent material associated with the front cover, to close the opening on the front cover in the event that the heat and smoke event occurs on the front side of the electrical box assembly.

In an embodiment, the electrical box assembly further comprises means to mount the assembly to a wall. For example, the distance between the outer side panels is preferably about 14.2 inches to fit between studs placed 16 inches on center, so that the side panels can be attached directly to the studs by screws, nails, or other similar fasteners. In a preferred embodiment, the electrical box assembly further comprises one or more stud brackets for attaching the electrical box assembly to the studs, where the stud brackets provide positive positioning of the electrical box assembly on the studs and can have a width for filling a gap between the outer side panel(s) and the adjacent stud when a smaller electrical box assembly is used or when the studs are more than 16 inches on center.

In a preferred embodiment, where the electrical box assembly is mounted prior to the installation of the drywall material, extensions are provided that extend outwardly beyond the front panel. The extensions can be formed as part of the front panel, as part of the inner top, bottom, first side and/or second side walls, or formed independently and attached to one or more of these components. Preferably, the extensions extends from about 0.5 to about 0.625 inches beyond the front frame member to accommodate drywall material covering the front panel(s) up to the inner box assembly. In such an embodiment, the drywall material can be installed up to the inner top, bottom and side panels so that the installation of the cover frame extends over the gap between the drywall and the inner panels, to create a finished look.

Common elements such as ground wires, partition panels and the like can also be incorporated into the electrical box assembly of the present invention.

BRIEF DESCRIPTION OF THE DRAWINGS

The present invention is better understood when considered in view of the attached drawings, in which like reference characters indicate like parts. The drawings, however, are presented merely to illustrate the preferred embodiments of the invention without limiting the invention in any manner whatsoever.

FIG. 3 is a front right perspective view of the fire-resistant electrical box of the present invention shown in FIG. 2 without the cover panel installed.

FIG. 4 is a rear right perspective view of the fire-resistant electrical box of the present invention of FIGS. 2 and 3.

FIG. 5 is a front elevation of the fire-resistant electrical box of the present invention.

FIG. 6 is a rear elevation of the fire-resistant electrical box of the present invention.

DETAILED DESCRIPTION OF THE PREFERRED EMBODIMENT

Figure 1:
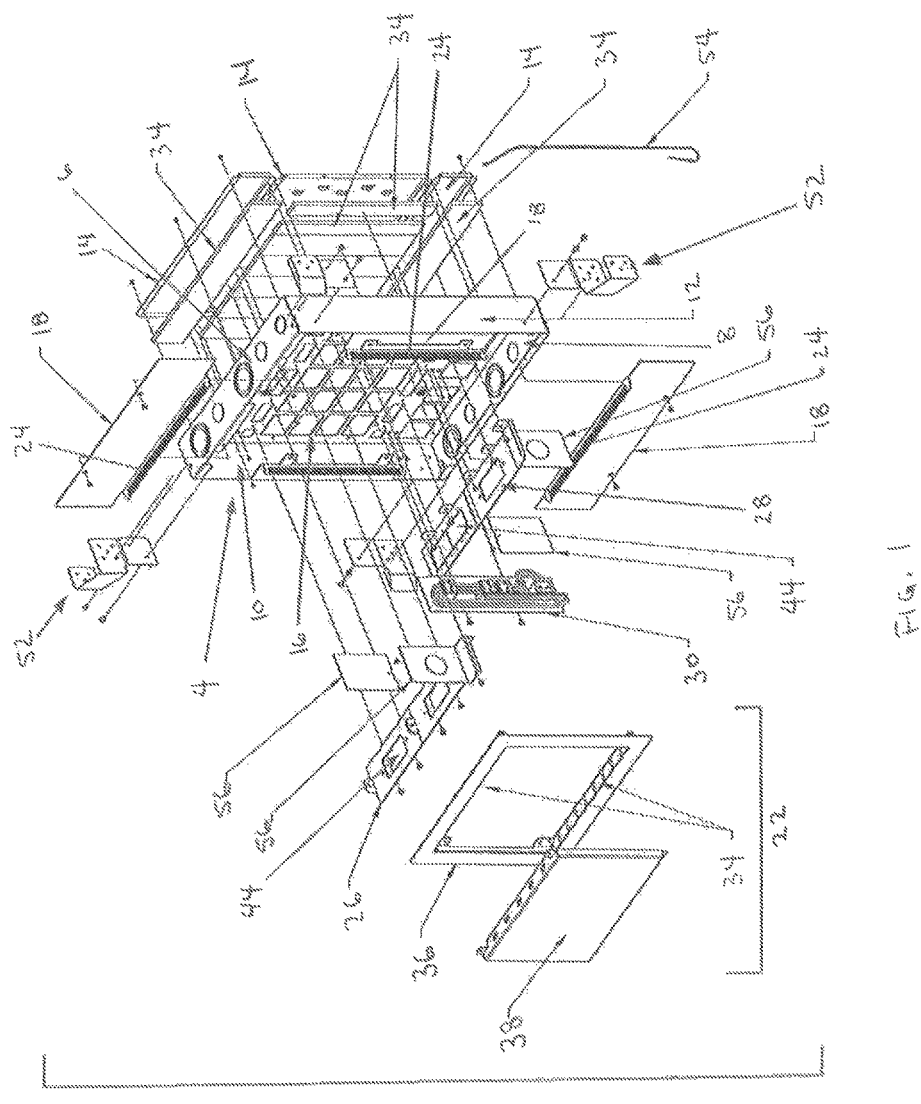
FIG. 1 is an exploded view of the fire-resistant electrical box of the present invention.

As shown in the accompanying figures, and particularly FIG. 1, the fire-resistant electrical box assembly 2 comprises an outer box assembly 4 having an outer top panel 6, an outer bottom panel 8, an outer first side panel 10, an outer second side panel 12, an outer back panel 14, an inner back panel 16, and a front panel 18 forming an opening substantially covered by a front cover 22. An inner box assembly for mounting connections and enclosing the wiring within the outer box assembly 4 is formed of one or more of an inner top panel 26, an inner bottom panel 28, an inner first side panel 30, and an inner second side panel (not shown). A heat activated intumescent material 34 is placed between at least a portion of the outer back panel 14 and the inner back panel 16.

The electrical box assembly 2 preferably further comprises an intumescent material 34 associated with the front cover 22, preferably on the interior of the front cover itself, i.e., on a cover frame 36, on the cover panel 38, on one or more of the front cover members 14, etc., to close the front of the electrical box assembly 2 during fire and smoke conditions on the front side of the electrical box assembly 2. Additional intumescent material 34 may be associated with the outer and/or inner top, bottom and/or side panels of the outer or inner box assemblies as well, and installation of the electrical box assembly 2 in a wall may further include the use of an intumescent caulk material about the drywall material of the wall.

In the preferred embodiment shown, the outer back panel 14 and front panel 18 may be formed of a plurality of members, which may be attached to each other or, as with the outer back panel 14, attached to the inner back panel 16. Moreover, the front panel 18 may be formed from top and bottom members, with side members formed from folds of the outer first and second side panels (10, 12), as shown in FIG. 1.

In the most preferred embodiment, the opening in the front panel 18 over which the front cover 22 is placed has extensions 24 extending outwardly beyond the front panel 18. The extensions 24 may be formed from the front panel 18 members, as shown in FIG. 1, as part of the inner top, inner bottom and inner side panels (26, 28, 30), or independently formed and attached to one or more of these members.

Figure 8:
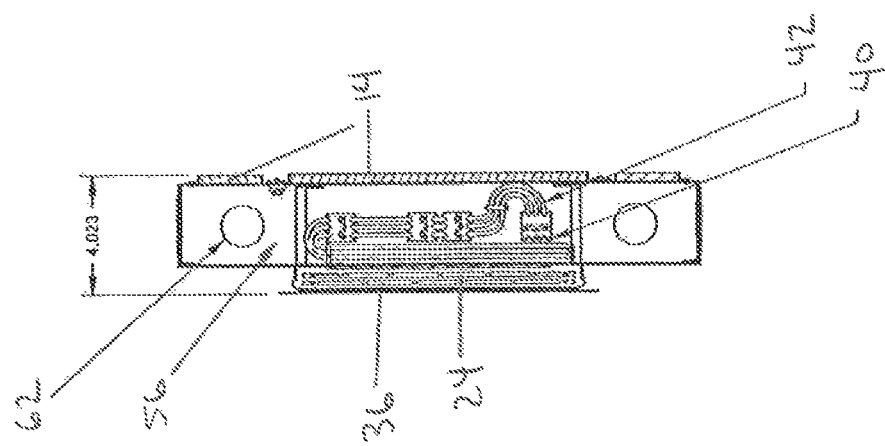
FIG. 8 is a cross sectional elevation of the fire-resistant electrical box of the present invention through line A-A of FIG. 5.
Figure 7:
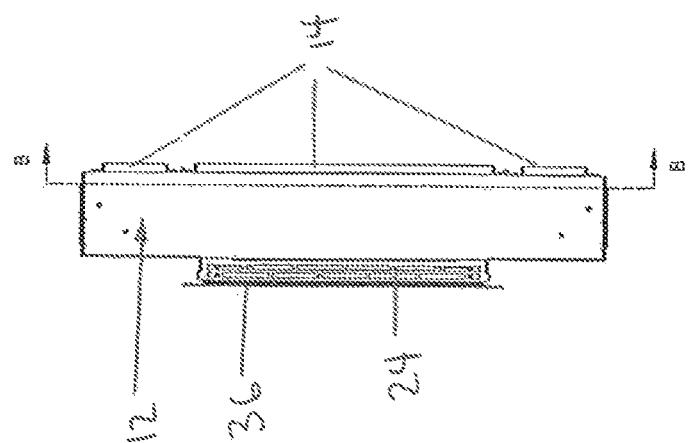
FIG. 7 is a right side elevation of the fire-resistant electrical box of the present invention.

In the preferred embodiment, the extensions 24 act as a spacer for a drywall material to cover the front panel 18 up to the extensions 24, so that the edge of the cover frame 36 covers the edges of the drywall when fully installed. This provides a finished look to the installed electrical box assembly 2 when the installation is complete, without the need to spackle the drywall up to the edges of the extensions 24. As such, it is preferred that the extensions 24 extend from about 0.5 to about 0.625 inches beyond the front panel 18, as best shown in FIGS. 7 and 8, to accommodate drywall material covering the front panel 18 up to the inner box assembly.

Figure 9:
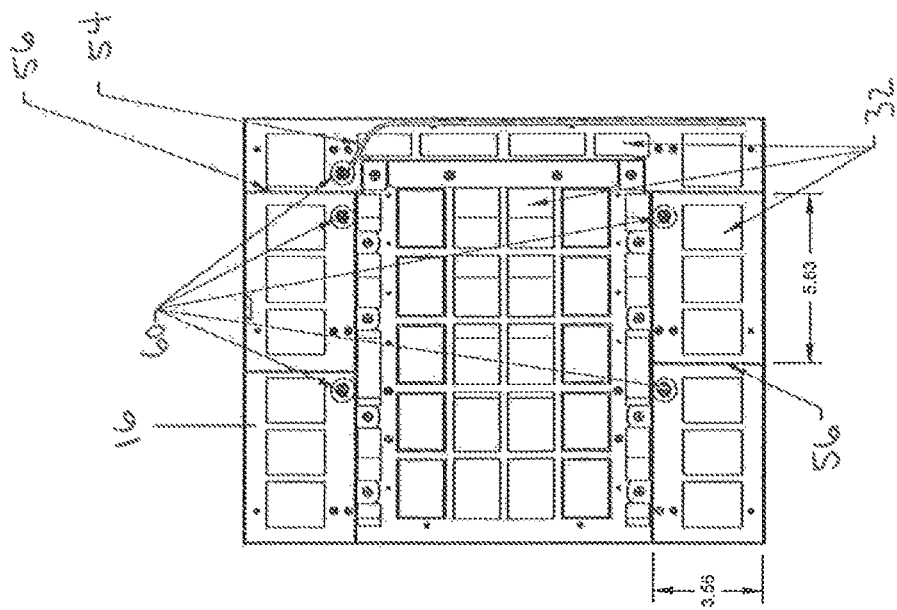
FIG. 9 is a cross sectional elevation of the fire-resistant electrical box of the present invention through line B-B of FIG. 7.

The intumescent material 34 is primarily located between the outer back panel 14 and the inner back panel 16. The inner back panel 16 preferably includes a number of openings 32 for the intumescent material 34 to expand into, creating a seal to prohibit the passage of smoke through the electrical box assembly 2 when the intumescent material 34 is activated by heat. The back panel 14 not only covers the intumescent material 34, but also acts as a stop to direct the intumescent material 34 into the openings 32 of the inner back panel 16. The outer back panel 14 may be attached to the inner back panel 16 about the openings in the inner back panel by any known means, and is preferably attached by screws 60, as shown in FIGS. 4, 6 and 9.

The interior of the electrical box assembly 2 is configured to create an accessible inner box assembly with AC outlets, audio visual connectors, Ethernet jacks, telephone jacks, and any other suitable jacks and connectors (hereinafter "connectors") that may need to be accessed by a user. As shown in FIGS. 1 and 3, one or more of the inner side panels 30, the inner bottom panel 28, and the inner top panel 26 preferably contain knock-outs 44 that permit the mounting of connectors that can be accessed when the front cover 22 is removed. For example, FIG. 3 shows the mounting of AC outlets 40 on the inner side panel 30. As shown in FIGS. 1 and 8, the wiring 42 for the AC outlets 40 is contained behind the inner side panel 30, between the inner side panel 30 and the outer side panel 12. Of course, other suitable connectors can be used in the knock-outs of the inner panels, with the wiring contained within the space between corresponding outer and inner panels.

The front cover 22 is preferably adapted to cover virtually all of the opening in the front panel 18, generally corresponding to the size of the inner box assembly, most preferably leaving one or more openings 58 to permit wire/cable passage from the interior to the exterior of the inner box assembly and to vent the interior of the electrical box assembly 2. In the preferred embodiment shown, the cover 22 includes a cover frame 36 that affixes to the front panel 18 or extensions 24, about the opening to the inner box assembly.

The cover frame 36 comprises a lip that extends parallel to the front panel 18 to cover the area just beyond the extensions 24, thereby providing a finished frame about the inner box assembly, and includes means, shown as tabs, for receiving or mounting a cover panel 38. The cover panel 38 is preferably fixed to the cover frame 36 by any known means, including snap in, hinged and fastener connections, such as screws, being most preferred.

Figure 2:
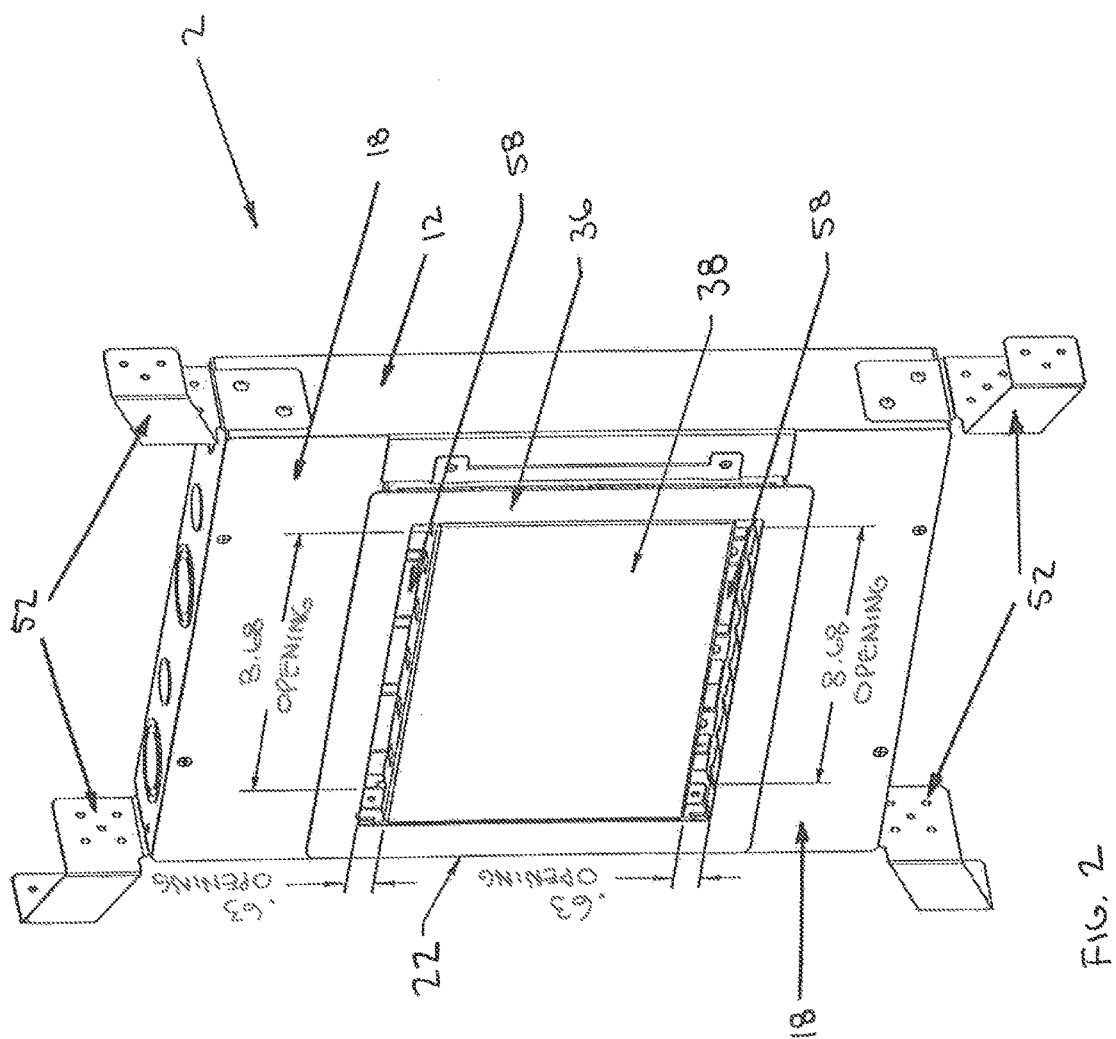
FIG. 2 is a front left perspective view of the fire-resistant electrical box of the present invention with stud mounting brackets the cover panel installed.

In the preferred embodiment, as best shown in FIGS. 2 and 5, the opening 58 associated with the front cover 22 is created by making the cover panel 38 slightly smaller than the opening in the cover frame 36, leaving a gap between the cover panel 38 and the cover frame 36. In a most preferred embodiment, a gap between the cover panel 38 and the cover frame 36 forms an opening 58 at each of the top and bottom edges of the cover panel 38 for the passage of wires/cables and for venting the interior of the electrical box assembly 2.

This embodiment is particularly well suited for use of an intumescent material associated with the front cover 22 as well, to close the opening(s) 58 on the front cover 22 in the event that the heat event occurs on the front side of the electrical box assembly 2. Preferably, the intumescent material 34 is positioned on the top and bottom edges of the cover frame 36. Of course, the intumescent material 34 can be mounted on the back of the cover panel 38 below the upper and lower edges. This is designed so that, in the event of substantial heat, the intumescent material expands in a direction to force the closure of the opening(s) 58.

In an embodiment, the electrical box assembly 2 further comprises means to mount the assembly within a wall. For example, the distance between the outer side panels 10, 12 is preferably about 14.2 inches, so that it fits between studs placed 16 inches on center. Although the side panels 10, 12 can be attached directly to the studs by screws, nails, or other similar fasteners, the preferred embodiment comprises one or more stud brackets 52 for attaching the electrical box assembly 2 to the studs. Most preferably, the stud brackets 52 provide positive positioning of the electrical box assembly 2 on the studs, and can have a width for filling a gap between the outer side panels 10, 12 and the adjacent stud if a smaller electrical box assembly 2 is used, or the studs are placed more than 16 inches on center.

Common elements such as ground wires 54, partition panels 56 and the like can also be incorporated into the electrical box assembly 2 of the present invention. For example, as shown in FIGS. 8 and 9, partition panels 56 having openings 62 for the passage of wire/cable can be used between the outer top, bottom and/or side panels and the inner top, bottom and/or side panels, with use between the outer and inner top and side panels being most preferred.

Variations, modifications and alterations to the above detailed description will be apparent to those skilled in the art. All such variations, modifications and/or alternatives are intended to fall within the scope of the present invention, limited only by the claims.

The terms "comprising" or "comprises" as used in the following claims are open-ended transitional terms that is intended to include additional elements not specifically recited in the claims.

It should be noted that it is envisioned that any feature or element that is positively identified in this document may also be specifically excluded as a feature or element of an embodiment of the present invention.

The invention claimed is:

1. A fire-resistant electrical box assembly comprising:
   an outer box assembly comprising an outer top panel, an outer bottom panel, an outer first side panel, an outer second side panel, an inner back panel, an outer back panel coupled to the inner back panel, and a front panel formed of one or more members with an opening capable of being substantially covered by a front cover;
   one or more of an inner top panel, an inner bottom panel, an inner first side panel, and an inner second side panel mounted within the outer box assembly, wherein at least one of the one or more of the inner top panel, the inner bottom panel, the inner first side panel having an opening to mount a connector thereon; and
   an intumescent material between at least a portion of the outer back panel and the inner back panel.

2. The fire-resistant electrical box assembly of claim 1 wherein at least one of the outer top panel, the outer bottom panel, the outer first side panel, the outer second side panel, the outer back panel, the inner back panel and the front panel are formed of a metal material.

3. The fire-resistant electrical box assembly of claim 1 wherein at least one of the one or more of the inner top panel, the inner bottom panel, the inner first side panel and the inner second side panel are made of a metal material.

4. The fire-resistant electrical box assembly of claim 1 wherein the inner back panel comprises one or more openings.

5. The fire-resistant electrical box assembly of claim 1 wherein the outer back panel is attached directly to the inner back panel.

6. The fire-resistant electrical box assembly of claim 1 wherein at least one of the outer top panel and the outer bottom panel comprises one or more knock-outs.

7. The fire-resistant electrical box assembly of claim 1 wherein at least one of the one or more of the inner top panel, the inner bottom panel, the inner first side panel and the inner second side panel comprises one or more knock-outs.

8. The fire-resistant electrical box assembly of claim 1 further comprising one or more alternating current receptacles mounted on the at least one of the one or more of the inner top panel, the inner bottom panel, the inner first side panel and the inner second side panel.

9. The fire-resistant electrical box assembly of claim 1 wherein the front cover comprises a cover frame, coupled to the front panel of the outer box assembly, and a cover panel, coupled to the cover frame.

10. The fire-resistant electrical box assembly of claim 9 wherein the front cover comprises one or more openings.

11. The fire-resistant electrical box assembly of claim 10 wherein at least one of the one or more openings is formed as a gap between the cover frame and the cover panel.

12. The fire-resistant electrical box assembly of claim 11 further comprising an intumescent material mounted along the gap.

13. The fire-resistant electrical box assembly of claim 1 further comprising an intumescent material associated with the front cover.

14. The fire-resistant electrical box assembly of claim 1 further comprising one or more partition panels between one or more of the outer top panel and the inner top panel, the outer bottom panel and the inner bottom panel, the outer first side panel and the inner first side panel and the outer second side panel and the inner second side panel.

15. The fire-resistant electrical box of claim 1 wherein the front panel is formed of a plurality of front panel members.

16. The fire-resistant electrical box assembly of claim 1 further comprising one or more extensions extending outwardly beyond the front panel.

17. The fire-resistant electrical box assembly of claim 16 wherein the extensions extend from about 0.5 to about 0.625 inches beyond the front panel.

18. The fire-resistant electrical box assembly of claim 16 wherein the one or more extensions are formed integrally with the front panel.

19. The fire-resistant electrical box assembly of claim 16 wherein the one or more extensions are formed as part of the inner top, inner bottom, inner first side and inner second side panels.

20. The fire-resistant electrical box assembly of claim 1 further comprising stud brackets coupled to one or more of the outer top panel, the outer bottom panel, the outer first side panel, and the outer second side panel.

* * * * *